(12) United States Patent
Kheterpal

(10) Patent No.: US 10,004,995 B2
(45) Date of Patent: Jun. 26, 2018

(54) PERCUSSION INSTRUMENT

(71) Applicant: BISH BASH PRODUCTIONS LTD., London (GB)

(72) Inventor: Sudha Kheterpal, London (GB)

(73) Assignee: BISH BASH PRODUCTIONS LTD., London (GB)

( * ) Notice: Subject to any disclaimer, the term of this patent is extended or adjusted under 35 U.S.C. 154(b) by 0 days. days.

(21) Appl. No.: 15/126,713

(22) PCT Filed: Mar. 17, 2015

(86) PCT No.: PCT/GB2015/050777
§ 371 (c)(1),
(2) Date: Sep. 16, 2016

(87) PCT Pub. No.: WO2015/140536
PCT Pub. Date: Sep. 24, 2015

(65) Prior Publication Data
US 2017/0113154 A1 Apr. 27, 2017

(30) Foreign Application Priority Data
Mar. 18, 2014 (GB) .................................. 1404861.5

(51) Int. Cl.
*G10D 13/06* (2006.01)
*A63H 5/00* (2006.01)
*H02J 7/00* (2006.01)
*H02J 7/32* (2006.01)
*A63H 33/26* (2006.01)

(52) U.S. Cl.
CPC ............... *A63H 5/00* (2013.01); *A63H 33/26* (2013.01); *G10D 13/06* (2013.01); *H02J 7/0047* (2013.01); *H02J 7/32* (2013.01)

(58) Field of Classification Search
CPC .................................. A63H 5/00; G10D 13/06
See application file for complete search history.

(56) References Cited

U.S. PATENT DOCUMENTS

| 3,696,251 | A | * | 10/1972 | Last | F03B 13/1855 290/53 |
| 4,114,305 | A | * | 9/1978 | Wohlert | A01K 85/01 310/15 |
| 4,140,932 | A | * | 2/1979 | Wohlert | H02K 35/02 310/15 |
| 4,500,827 | A | * | 2/1985 | Merritt | H02K 35/02 290/1 R |

(Continued)

FOREIGN PATENT DOCUMENTS

CN 202454246 U 9/2012

OTHER PUBLICATIONS

International Search Report, International Application No. PCT/GB2015/050777 dated Aug. 14, 2015, 4 pages.

(Continued)

*Primary Examiner* — Robert W Horn
(74) *Attorney, Agent, or Firm* — Rankin, Hill & Clark LLP

(57) ABSTRACT

A percussion instrument comprising an energy harvesting device is disclosed, embodiments take the form of a percussion shaker and a drum, various implementations are disclosed for harvesting kinetic energy from motion imparted to the instrument and converting it to electrical energy for later use and for transfer to an external device.

17 Claims, 8 Drawing Sheets

(56) References Cited

U.S. PATENT DOCUMENTS

| | | | |
|---|---|---|---|
| 5,449,964 A | 9/1995 | Snyder | |
| 5,975,714 A * | 11/1999 | Vetorino | H02K 35/02 310/15 |
| 6,809,427 B2 * | 10/2004 | Cheung | H02K 35/02 290/1 R |
| 6,812,583 B2 * | 11/2004 | Cheung | H02K 35/02 290/1 A |
| 7,009,310 B2 * | 3/2006 | Cheung | B60C 23/041 290/1 R |
| 7,009,315 B2 * | 3/2006 | Takeuchi | H02K 35/00 290/1 R |
| 7,089,043 B2 * | 8/2006 | Tu | H02J 7/32 310/12.12 |
| 7,148,583 B1 * | 12/2006 | Shau | H02K 7/1876 290/1 A |
| 7,498,681 B1 * | 3/2009 | Kellogg | H02K 35/02 290/1 R |
| 7,525,203 B1 * | 4/2009 | Racho | H02K 7/1876 290/1 R |
| 8,013,479 B2 * | 9/2011 | Peng | H02K 35/02 310/12.12 |
| 8,168,875 B2 * | 5/2012 | Stockli | G10D 13/003 84/422.4 |
| 8,432,071 B2 * | 4/2013 | Huang | H02J 1/10 307/151 |
| 8,729,747 B2 * | 5/2014 | Arnold | H02K 35/02 310/14 |
| 8,853,870 B2 * | 10/2014 | Moss | F03G 7/08 290/1 R |
| 9,035,160 B2 * | 5/2015 | Rapp | G10H 3/125 84/104 |
| 9,041,230 B2 * | 5/2015 | Arnold | H02K 35/04 290/1 R |
| 9,184,627 B2 * | 11/2015 | Huang | H02J 3/385 |
| 9,197,143 B1 * | 11/2015 | Townsend | H02N 2/181 |
| 9,257,896 B1 * | 2/2016 | Shih | H02M 1/14 |
| 9,360,206 B2 * | 6/2016 | Hiss | G10D 13/00 |
| 9,601,938 B2 * | 3/2017 | Huang | H02J 7/0055 |
| 2008/0174187 A1 * | 7/2008 | Erixon | H02K 33/16 310/15 |
| 2009/0085359 A1 * | 4/2009 | Mabuchi | H02K 35/02 290/1 R |
| 2009/0121493 A1 | 5/2009 | Lemieux | |
| 2010/0187835 A1 * | 7/2010 | Hohlfeld | B81B 3/0021 290/1 R |
| 2011/0017046 A1 * | 1/2011 | Stockli | G10D 13/003 84/422.4 |
| 2013/0152768 A1 * | 6/2013 | Rapp | G10H 3/125 84/634 |
| 2013/0324059 A1 * | 12/2013 | Lee | H04W 52/02 455/127.1 |
| 2015/0048682 A1 * | 2/2015 | Murley | H02J 17/00 307/52 |
| 2015/0198670 A1 * | 7/2015 | Thiel | G01R 31/362 324/426 |
| 2015/0355662 A1 * | 12/2015 | Myers | G06F 17/5068 323/311 |
| 2016/0375373 A1 * | 12/2016 | Fassbender | A63H 33/00 446/397 |
| 2017/0113154 A1 * | 4/2017 | Kheterpal | A63H 5/00 |

OTHER PUBLICATIONS

GB Search Report dated Aug. 12, 2014, 2 pages.
Earnhart, Alison, "Using Piezoelectric Technology to Harvest Energy from Drums and Inspire an Engaging High School Classroom Experience", The University of Texas at Austin, Aug. 2012, pp. 1-6, 15-18, 22 & 33, 58 pages.

* cited by examiner

LOW POWER ENERGY HARVESTING AND BATTERY

PERCUSSION INSTRUMENT

TECHNICAL FIELD

The invention relates to percussion instruments and the recovery of energy therefrom as well as children's toys. In particular, the invention relates to a device for energy capture from a percussion instrument, a percussion instrument comprising a device for energy capture, and a system for mounting a percussion instrument incorporating a device for energy capture. The invention can also be applied to children's toys and other items which are subjected to movement.

BACKGROUND TO THE INVENTION AND PRIOR ART

Percussion instruments have been in widespread use around the world since long before recorded musical history. They are instruments which are struck, or shaken or scraped, in order to produce a sound, and come in numerous different varieties. Many percussion instruments that are in common use today require the player to exert a great deal of energy while playing the instrument, in order to produce the required level of sound. A proportion of this energy is translated directly into sound energy, which gives each instrument its dynamic range and characteristic prominence over other instruments such as strings. However, much of the energy input to a percussion instrument can nonetheless be wasted.

Percussion instruments (and indeed all musical instruments) can be classified according to the Hornbostel-Sachs system for musical instrument classification. This characterises percussion instruments into two broad categories: idiophones and membranophones.

Idiophones are those instruments which produce sound primarily through the actual body of the instrument vibrating. Examples of idiophones are the xylophone and marimba, which are tuned idiophones, or a plethora of shakers and rattles, which are known as shaken idiophones. Shaken idiophones include vessel rattles, or simply shakers, in which rattling objects enclosed in a hollow vessel strike against each other or the walls of the vessel or both. These instruments are usually held in the hand of the player and shaken rhythmically.

The motion required to produce a musical sound from a shaken idiophone needs to vigorously shake the rattle members within, and more often than not requires that the player oscillate the instrument rhythmically back and forth. Rattle members are often a small portion of the mass of the instrument as a whole, and so a large amount of kinetic energy goes into moving the body and not making sound.

Membranophone is a term which broadly covers all types of drum, that is, an instrument which has a body and a tightly stretched membrane or skin, usually over a hollow body which vibrates in a way dependent on the manner in which the instrument is played. Most membranophones are struck with either the hand or a beater, but some involve rubbing the skin (such as the bodhran) and others use air currents to vibrate the membrane (in the case of a kazoo). Many drums are designed to be played manually, that is, by hand without a stick or a beater. Examples include conga drums, bongos, tabla etc.

The djembe is a very popular hand drum, originating from West Africa. The drum can produce a variety of different sounds and tones, depending on the vibrational modes introduced into the skin, which depend on the force applied and location in which the drum is struck.

A drummer playing a drum with either his or her hands or with sticks or beaters will impart a great deal of kinetic energy into the drum skin, and also to the body of the drum. When playing a typical hand drum, for example, the player hits the drum skin with the fingers extending toward the middle of the drum, and the palm and heel of the hand transmits most of the playing force to the interface between the skin and the body or side walls of the drum. In some instances, a player may wish to make an entirely different sound altogether, and strike only the wall of the drum. When playing the snare drum, or modern drums, a rim shot is where the player strikes an O ring of metal that is used to tension the drum skin.

Many mounting technologies have been developed to minimise the vibration of the body of drums during their playing, while minimising changes to the acoustic properties of the drum or percussion instrument. Often a set of drums (congas, or rock drums, for example) will be mounted on secure metal frame mounts to keep them in position during playing.

Electronic musical instruments are known which convert movements made by the player into electrical signals which are sent to a processor and onward to output means to output sound—for example electronic percussion or keyboard instruments. In such instruments, only a signal representative of the input is generated. The signal is instantaneous and although a digital value indicative of its characteristics may be stored or processed, energy from the input is not stored or re-used. The creation of the electrical signals is not designed to maximise the amount of electrical energy based upon the amount of energy imparted by the player.

Microphones and other recording or "pick-up" devices, when placed in or near instruments have to be designed such that they do not detrimentally alter the acoustic properties of the instrument, and therefore the amount of energy extracted for their function must be minimised. The focus of such devices is on the fidelity of the output signal, while minimising the energy extracted from the instrument to avoid affecting the musical quality, timbre or tone.

Children's toys are also items which can be subjected to significant input of kinetic energy, either during normal use as they are played with, thrown, carried or shaken by children, or also where they are toy instruments.

The reclamation of energy is a well-known problem and an increasing concern with the population's increasing electrical energy needs. It is known in transport technology, such as in cycling, for example, to use the kinetic energy of a person created while riding a bicycle connected to a dynamo-electric circuit to charge a mobile phone, for example.

SUMMARY OF THE INVENTION

Reclaiming some of the energy expended during the playing of different percussion instruments, either from the instrument itself, or from the means by which the instrument is mounted can make better use of energy otherwise lost in percussion instruments.

Embodiments of the present invention aim to capture the kinetic energy imparted to a percussion instrument, be it from shaking or striking, and convert it into electrical energy, which can then be stored for later use. The stored electrical energy can be transferred to a separate electrical device which is connectable to the percussion instrument or device of the invention to gain electrical energy therefrom.

According to a first aspect of the invention there is provided a percussion instrument, comprising means for converting kinetic energy imparted to the instrument into electrical energy; means for storing the electrical energy for later use; and means for transferring the stored electrical energy to an externally connected electrical device.

This invention allows the user of a percussion instrument to harvest energy expended while playing the instrument for later use—such as charging a low power electrical device—without modifying the behaviour needed to use the instrument, and without negatively affecting the acoustic or tonal properties of the instrument.

Preferably, the instrument comprises a main body forming the principal structure of the instrument, and one or more oscillating member or members, arranged to oscillate relative to the main body, and preferably the means for converting kinetic energy to electrical energy is configured to convert kinetic energy imparted to the main body of the instrument into electrical energy.

The amount of energy imparted to the body of percussion instruments which is not converted into sound can be harvested in this way, making use of previously wasted or unused energy.

Preferably, the instrument is a shaken idiophone.

The body of a shaken idiophone is shaken to produce its sound. The kinetic energy required to move the whole body of the instrument is not all converted into sound energy, and the present invention makes use of this previously unused kinetic energy.

According to a second aspect of the invention, there is provided an energy recovery device comprising: means for converting kinetic energy into electrical energy; means for storing the electrical energy for later use; and means for transferring the electrical energy to an externally connected electrical device, wherein the energy recovery device is adapted to be attached to a percussion instrument to recover and store kinetic energy imparted to the instrument by a user as electrical energy.

Such a device may be attached to a percussion instrument to take advantage of kinetic energy imparted to the instrument during playing.

According to a third aspect of the invention, there is provided a system for energy recovery comprising a percussion instrument, an energy recovery device comprising: means for converting kinetic energy into electrical energy; means for storing the electrical energy for later use; and means for transferring the electrical energy to an externally connected electrical device, wherein the energy recovery device is adapted to be attached to a percussion instrument to recover and store kinetic energy imparted to the instrument by a user as electrical energy, and preferably a mount for the percussion instrument; wherein the energy recovery device is preferably arranged to be located between the mount and the percussion instrument.

Instruments benefiting from the features of the invention can include toy instruments for children. The energy recovering features and related electronics of the invention can be applied to any children's toy, be it a percussion instrument or otherwise, to recover either kinetic energy applied to the body of the toy, or other energy such as solar energy impinging on the toy or impinging on energy recovering devices attached thereto, such as a detachable solar panel. The energy can thus be stored in the toy for later use in electronics of the toy itself or for connection to external devices to deliver energy thereto. In the following description, although an instrument is the main subject of the disclosure, the term 'instrument' can generally be replaced with 'toy' or 'toy instrument' and the described features thus applied to toys in an equivalent manner.

It will also be apparent to the skilled reader in light of the teaching of the present disclosure that the kinetic energy recovery features described herein in relation to percussion instruments can be applied to substantially any article to recover energy therefrom, particularly kinetic energy applied to the article, and to store the recovered energy for later use.

Further aspects and features of the invention will be apparent from the appended claims.

BRIEF DESCRIPTION OF THE DRAWINGS

Further features and advantages of the present invention will become apparent from the following description of an embodiment thereof, presented by way of example only, and by reference to the drawings, wherein like reference numerals refer to like parts, and wherein.

DESCRIPTION OF THE EMBODIMENTS

Figure 1:
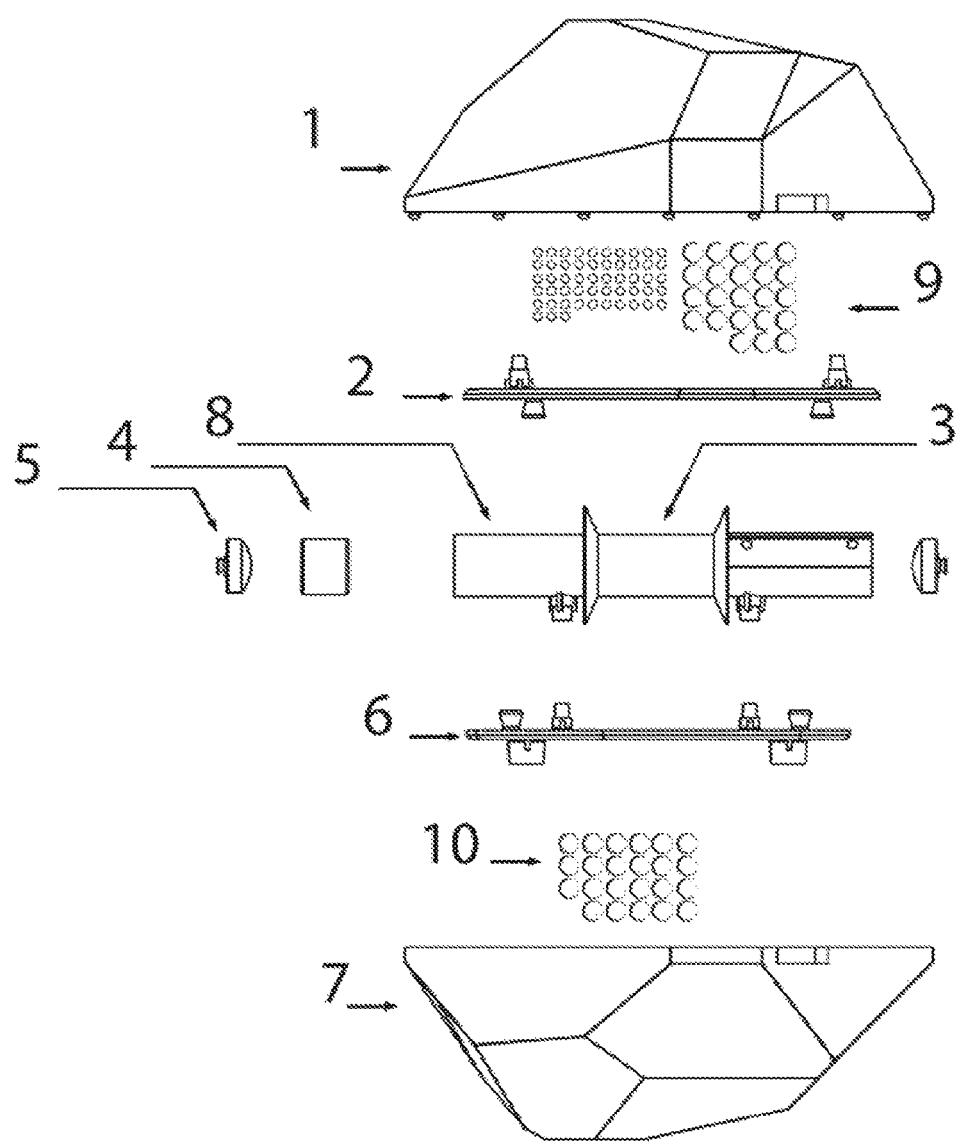
FIG. 1 is an exploded view of a shaker in accordance with an embodiment of the present invention.

As can be seen in FIG. 1, a shaker can be fitted with energy recovery means in order that kinetic energy imparted to the instrument can be cumulatively stored as electrical energy which can be used at a later time.

FIG. 1 shows a shaker which comprises a housing portion (1, 7) which is in two parts. The two parts are releasably joined by fixing means shown, in the embodiment of FIG. 1, as corresponding male and female connectors. A divider (2, 6) is placed inside each of the housing portions thereby creating a hollow rattle portion, in the form of a cavity within each housing portion. The rattle cavities contain rattle members which, when the shaker is played, impact with the sides of the rattle cavity defined by the interior of the housing portion and the divider, and each other, thereby creating the desired sound. The rattle members in each cavity are chosen depending on the desired acoustic characteristics of the instrument.

The configuration of the rattle portions can also create a central portion which houses the energy conversion and storage means, and related control circuitry. A coil 3 and armature 4 are contained in the energy convertor housing. The coil 3 comprises a barrel 8 in which the armature 4 is located. The armature is free to oscillate from one end of the barrel 8 to the other, and pass through the coil 3. Biasing means 5 are situated at the ends of the barrel 8 in order to prevent the armature 4 from coming out of the barrel 8. The biasing means 5 take the form of rubber bungs and bias the armature 4 against movement towards the end of the barrel 8.

Coil 3 is made of enamelled electrically conducting wire. Armature 4 is a preferably cylindrical slug, which is dimensioned according to the size of the barrel 8. Armature 4 is made of a material possessing a high density magnetic field, such as neodymium, which is a rare-earth metal. Neodymium magnets are the strongest permanent magnets known. This means that they can induce higher electromotive forces in solenoid coils than other magnets due to the increased magnetic flux density that they provide.

The housing portions, when assembled, form a unitary body, that is to say that the body has no arms or protuberances emanating from it. The body of the shaker is polyhedral. It is defined by a number of polygonal faces. The housing portions and dividers which form the structure of the shaker and shaker body can be fabricated by additive manufacturing processes, or by moulding.

Figure 3:
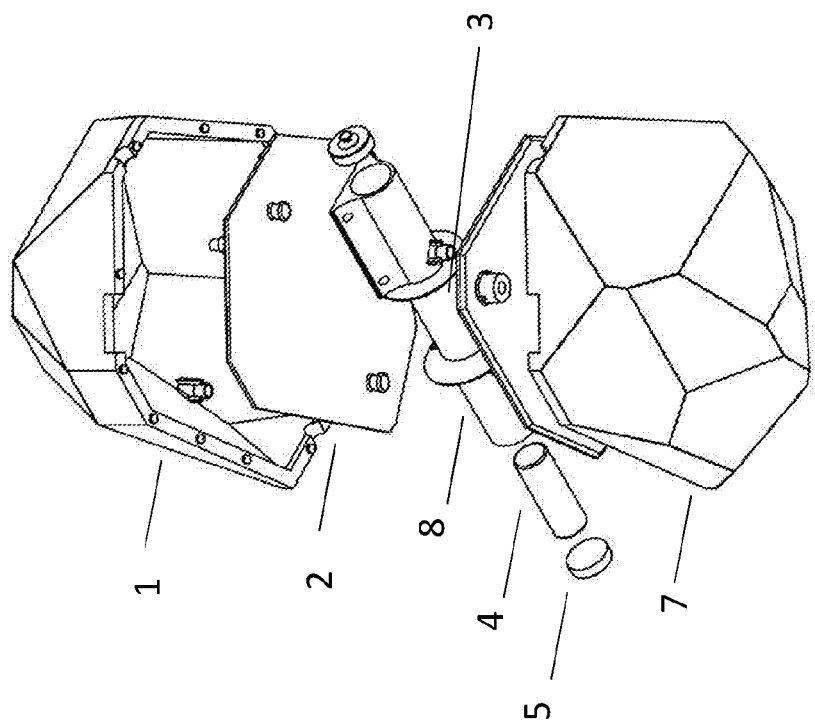
FIG. 3 is an exploded isometric drawing showing a shaker in accordance with the present invention as seen from below.
Figure 2:
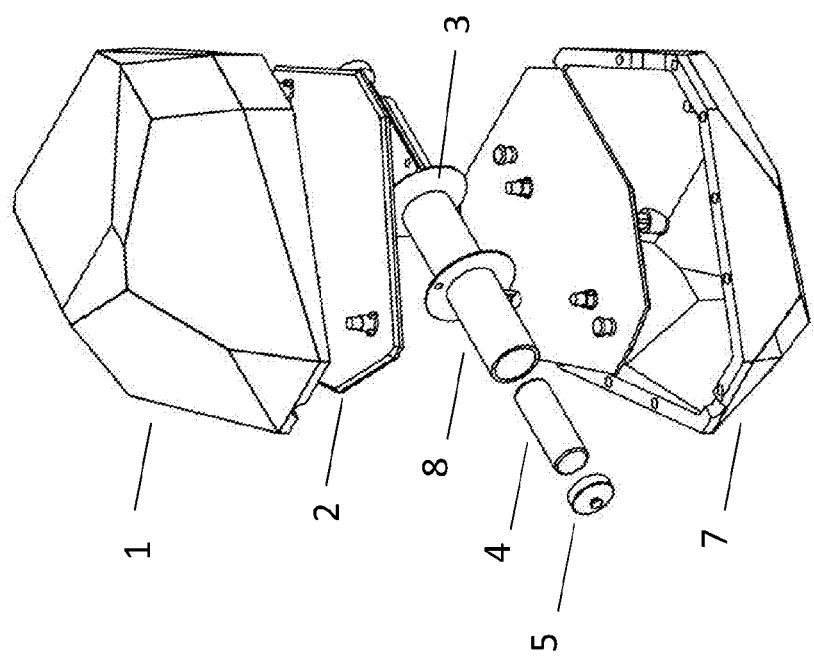
FIG. 2 is an exploded isometric drawing showing a shaker in accordance with the present invention as seen from above.

The body has a principal axis, which is aligned substantially along its longest axis. The shaker is designed to be shaken along this axis to give the most effective sound, since the rattle portion or portions have their longest dimension aligned substantially along this axis, to allow greatest travel of the rattle members, which are provided in the form of beads or balls 10 in the illustrated embodiment. As can be seen in FIGS. 2 and 3, the barrel 8 is oriented along this principal axis, and therefore the armature 4 moves substantially freely along this principal axis when the shaker is played, although some frictional resistance will of course be present. This is in order that the maximum amount of kinetic energy from the normal use of the instrument can be imparted into the armature 4, and be subsequently harvested via a coil 3, as electrical energy.

The coil 3 is attached to circuitry which is designed to collect and store electrical energy resulting from the current created in the coil 3 due to the oscillation of the armature 4 back and forth within the barrel 8. The electrical charge storage circuitry is described below.

The coil 3 is wound with 0.315 mm enamelled wire. The coil 3 converts kinetic energy into electric energy. The output of the coil 3 is connected to a bridge rectifier with low voltage drop Schottky diodes for maximum utilization. A filter capacitor is connected to the output of the rectifier to maintain more regular voltage output and therefore more efficient charging.

The energy storage comprises a battery, and may additionally or alternatively include a chargeable Lithium-ion super capacitor or a capacitor bigger than 100 uF.

Figure 4:
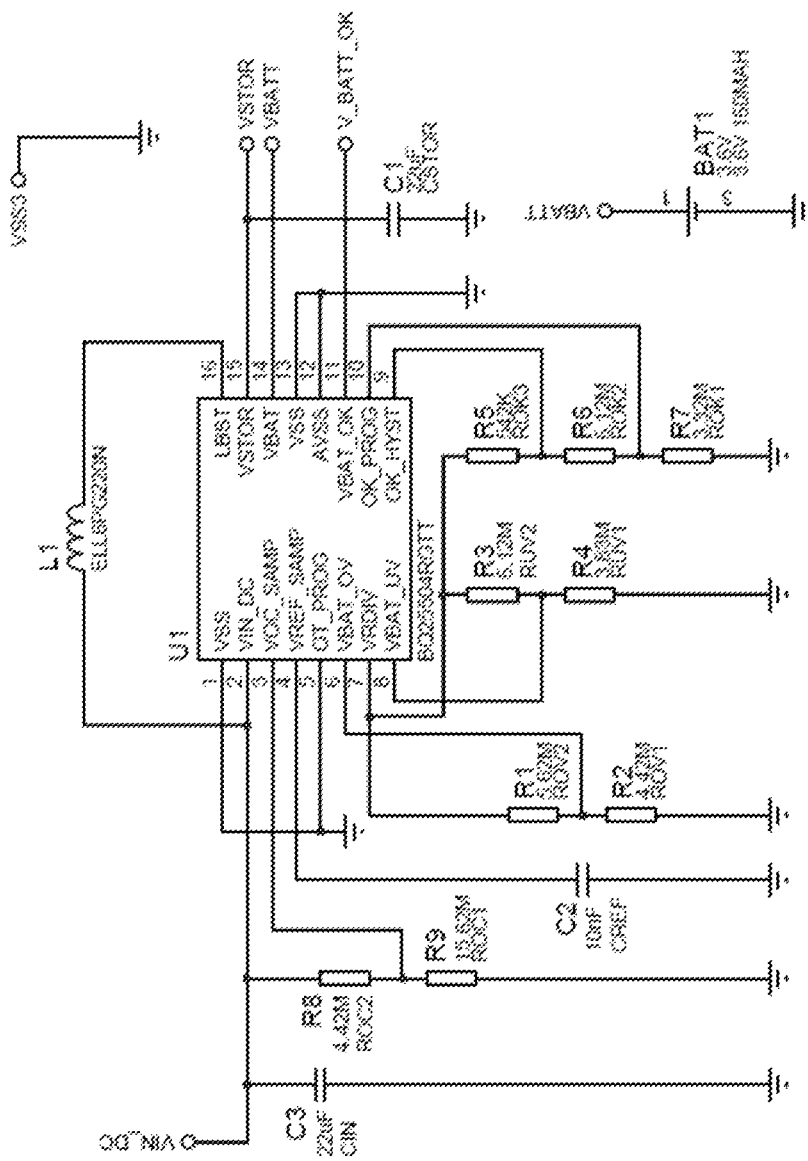
FIG. 4 is a schematic of a part of the circuitry of energy conversion means forming a part of the present invention.

The energy storage means further comprises a boost converter, shown in FIG. 4, to maintain charge current at low voltage inputs. The boost convertor begins working when the input voltage is bigger than 300 mV and it can work down to 80 mV to charge the battery. This property allows the harvesting of energy even at very slow motion. A boost convertor such as part BQ25504 from Texas Instruments is suitable for this application. The boost convertor has an indicator output V_BATT_OK which can be adjusted between a battery under voltage lockout threshold and battery over voltage lockout threshold. It is set to a voltage suitable for observing if the battery is charged to more than half of its capacity. An LED (not shown) is connected to V_BATT_OK and its operation will be further described below.

VSTOR is an output of the boost convertor for powering devices desired to be charged. This output is active if the battery charge is above the minimum battery discharge threshold. This prevents deep battery discharge when battery charge is lower than the minimum discharge threshold, and protects the battery from the negative effects associated with such discharge.

Battery charge indicators (not shown) allow the user to review the current charge status of the battery. A first LED is provided and can indicate if the battery is charged to more than half of its capacity. A second LED is used to observe if battery voltage is above minimum discharge voltage and is connected to the VSTOR pin. The second LED is controlled by V_BATT_OK pin and also connected to VSTOR pin. These two LEDs are connected to VSTOR via a switch to allow a user to check the battery charge status whenever desired and also prevent unnecessary battery discharge by constantly powering the LEDs. These LEDs can also be used for illumination in their own right when appropriately connected to a user input means for allowing a user to light the LED or LEDs manually. Other light emitting means may be used in place of LEDs.

A solar cell (not shown) is also optionally included in the device to allow for further charging of the battery. Any solar cell which has a maximum 5V output voltage may be used and the output of the solar cell is connected to the input of the boost convertor. This allows the boost convertor to continue to charge the battery, even at low lighting conditions.

The shaker further comprises a connector (not shown) for connecting a device to be charged. The connector is an electrical connector such as a standard USB port or other mechanically connecting electrical connector. A simple 5V 200 mA boost converter which supplies the regulated voltage for USB socket is located between the battery device and the USB port. Low power USB devices—up to 100 mA—can be powered by using this output. This converter is controlled by a switch which is attached to the USB socket. If there is nothing connected to USB socket then 5V boost converter will not be active. This prevents unnecessary battery use by the booster. As an alternative, power may be transferred wirelessly, as discussed further below.

In use, the player holds the shaker in his or her hand, and shakes the shaker along its principal axis to agitate the rattle members to create the desired sound. In so doing, the player oscillates the armature 4 within the barrel 8 back and forth through the coil 3. The magnetic armature 4 moving through the coil 3 creates an electromotive force in the coil 3 thanks to electromagnetic induction. This current will be an AC current due to the back and forth oscillations of the magnet through the coil 3.

The coil 3 is connected to a current rectifier which converts the AC to DC, which is to be stored in the battery.

Through playing the shaker over an extended period of time, the player can oscillate the armature 4 through the coil 3 hundreds or thousands of times, and this will gradually and cumulatively charge the battery over time. Further charge can be obtained from an optional photovoltaic cell provided on the surface of one or more of the housing portions. The photovoltaic cell is connected to the boost convertor and the battery and can charge the battery irrespective of whether the instrument is being played.

The battery may be charged by the kinetic energy conversion only, by the photovoltaic cell only, or by a combination of both simultaneously, as desired.

When the player has finished playing, or during play if necessary, it is possible to review the status of the battery charge. This can be done through the operation of a switch or button press. LED 2 will illuminate if there is sufficient charge in the battery for charging a further electrical device. If the battery charge is more than half the capacity, LED 1 will illuminate.

If the battery has sufficient charge to charge an external electrical device, the user can connect the device to the electrical output port for charging to commence. Once the connected electrical device has extracted sufficient charge it can be disconnected. If the charge that is contained within the battery reaches the minimum discharge threshold, the electrical device is no longer charged and can be disconnected.

The process can be repeated as many times as desired, depending on the tolerance of the battery for multiple charge/discharge cycles. Super capacitors can tolerate hundreds of thousands of charge/discharge cycles, if used properly.

It will be apparent that many modifications and alternatives exist which can be applied to this main embodiment. They will now be described, by way of example.

Evidently the body of the shaker can comprise many polygonal faces. Alternatively ergonomic shapes which are designed to fit into the hand are envisaged. The housing can be made of any material which will not affect the motion of the armature 4 within the barrel 8. If the housing portions were made of metal, eddy currents produced within the housing portions due to the motion of the armature 4 could work against its movement, and this energy may be lost. Therefore non-metallic and non-magnetic materials are preferable. These include plastics, or even wood.

The body can comprise one or more rattle cavities, and any combination of rattle cavities that can be contained within the body is possible. The rattle members can be selected due to their material properties, with different rattle cavities containing rattle members of having properties different to the rattle members of another rattle cavity. Rattle members can be selected based on their volume, with larger volume rattle members creating a lower pitched sound, and conversely smaller volume rattle members making a higher pitched sound. The rattle members can equally be selected based on their mass, density, or hardness, all of which properties will affect the acoustic characteristics of the shaker.

The rattle members can consist of beads, grains, metal filings, ball bearings or similar. The rattle members are contained within, but not attached to, the body of the device.

The housing members of the invention are secured together by cooperating male and female mechanical fixings. Alternatively the housing members can be secured together via an adhesive, or by other fixing means, such as latches, clips or the like. The fixing means are preferably repeatedly releasable to allow maintenance and component replacement.

The coil 3 and armature 4 can be constructed of different materials from those described above, which combine through the electromagnetic induction required to produce the storable electrical energy.

Biasing means 5 can be made of rubber having deformable, resilient or elastic properties, such that the armature 4 will rebound back towards the coil 3, which advantageously results in more effective oscillation of the armature 4. The biasing means 5 can also include damping means to reduce the sound or force caused by the impact at the end of the barrel 8. A further modification including spring members, either as a replacement for, or used in conjunction with the biasing means is envisaged. The spring means function in the same way as described above.

Alternatively, optional piezo-electric members can be inserted at the ends of the barrel 8, either in place of, or in combination with bungs 5. These piezoelectric members or elements can harvest the kinetic energy imparted by the armature 4 striking the end of the barrel 8, and can provide that energy as electrical energy to the boost convertor and/or to the battery, to be stored. The inclusion of the piezo electric members at the ends of the barrel 8 can therefore increase the amount of energy that is harvested in the device.

As further alternative embodiment of the invention, magnets can be placed at the ends of the barrel 8, either in combination with bungs 5 or not. The magnets can be oriented to bias the armature 4 against movement towards the ends of the barrel 8 to lessen or completely obviate the impact of the armature 4 against the end of the barrel 8.

In a further embodiment of the invention, a drum is fitted with energy harvesting, storage and transfer means.

Figure 5:
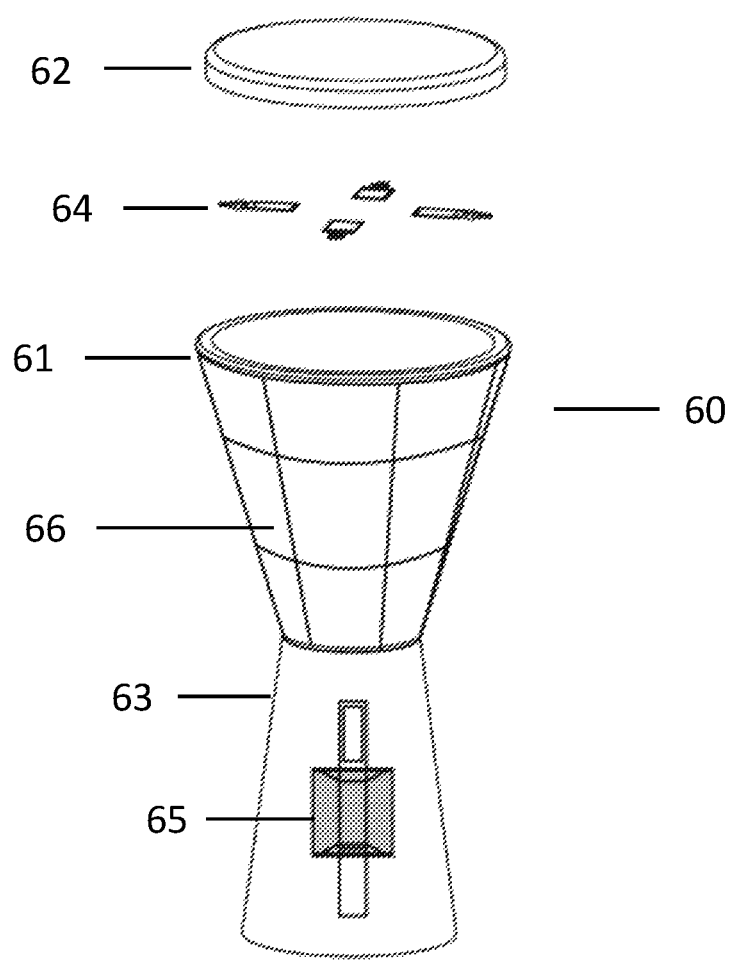
FIG. 5 is an exploded view of a drum, according to an embodiment of the present invention.

As can be seen in FIG. 5, a drum 60 has a body 61 and a skin 62. The drum 60 is shaped so that at the foot there is a hollow resonator portion 63. Although the drum in FIG. 6 resembles a djembe, the following description of the invention applies to any drum, with particular embodiments being potentially more suited to particular types of drum.

Considering the djembe shown in FIG. 5, when the drum 60 is played the player most often strikes the drum manually, i.e. without beaters or sticks. Most of the strokes that the player uses to play the djembe involve striking a combination of the skin 61 of the drum and the wall of the drum body 61 where the skin meets it. This means that a substantial amount of energy is imparted into the body of the drum 61, through this interface between the skin 61 and the drum body 61.

In an embodiment of the invention, a piezo-electric element or elements 64 is located in the drum, and the kinetic energy imparted into the drum 60 is transmitted to the piezo-electric element 64, which converts the vibrations into electrical energy. The electrical energy is passed via similar circuitry to that described above, to the boost convertor shown in FIG. 4 and to the battery.

In one embodiment of the invention, the piezo-electric element is located at the interface between the skin of the drum head and the body of the drum. The intention is that the maximum amount of kinetic energy from the normal playing of the drum can be imparted to the piezo-electric element, with little or no effect on the oscillations of the skin and the resulting tone.

In a further embodiment of the invention, the piezo-electric element is connected to a surface of the drum skin at a location distal from the wall of the body of the drum. The piezo-electric element can be located in the centre of the drum skin, or in a position at the centre or between the centre and the rim which takes full mechanical advantage of the vibrational modes of a particular drum, since for many vibrational modes the maximum displacement or deformation of the drum skin takes place at a location that is off-centre.

In still further an embodiment of the invention, the piezo-electric element is located in the wall of the drum itself.

In use, the drummer plays the drum as normal, and with each stroke the vibrations created in the skin of the drum, or in the wall of the drum, or in both in combination, are converted into electrical energy by the piezo-electric element and transmitted to the energy storage device, which cumulatively charges the battery. When the drummer has finished playing, or even during playing, the charge status indicator can be activated, and if there is sufficient charge, an external electrical device can be connected to the energy transfer means in order to charge the external device.

As is seen in FIGS. 5 to 8, the drum can also be fitted with photo-voltaic cells 66 on its outer surface which can also charge the battery, in the same manner as described above in relation to the shaken idiophone. Photo-voltaic cells 66 may be a single unit located substantially on one of the illustrated squares or may be provided in an array of differently oriented cells arranged around the drum, or around the shaker described above. The cells may be provided on a substantially flexible sheet which wraps around some or all of the outside surface of the drum or shaker.

Figure 8:
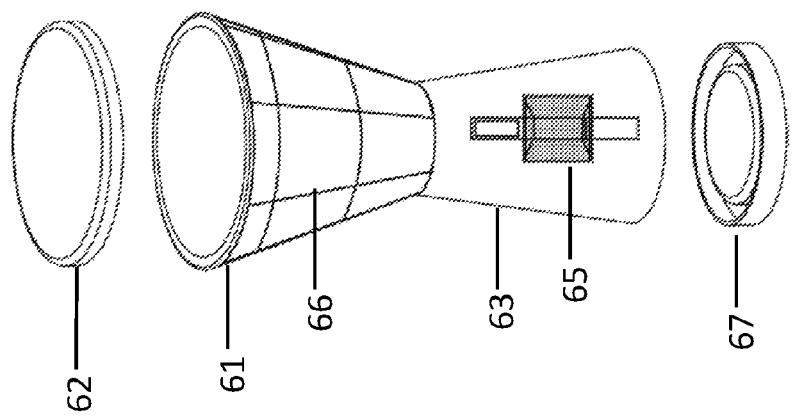
FIG. 8 is an exploded view of a drum, according to an embodiment of the present invention.
Figure 7:
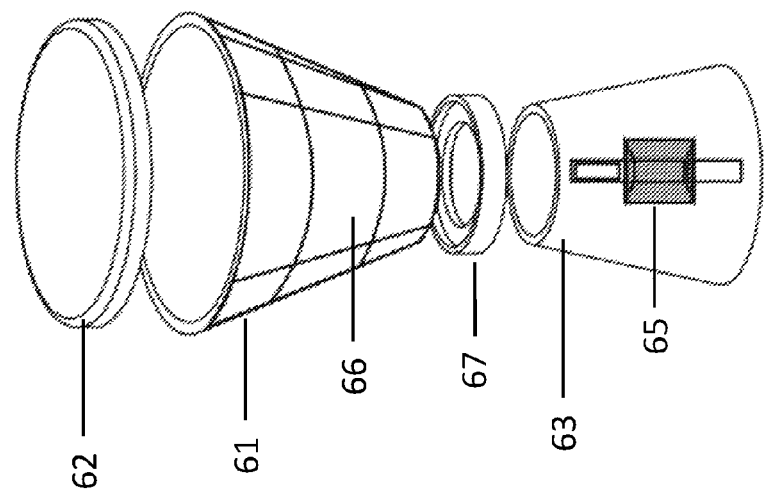
FIG. 7 is an exploded view of a drum, according to an embodiment of the present invention.
Figure 6:
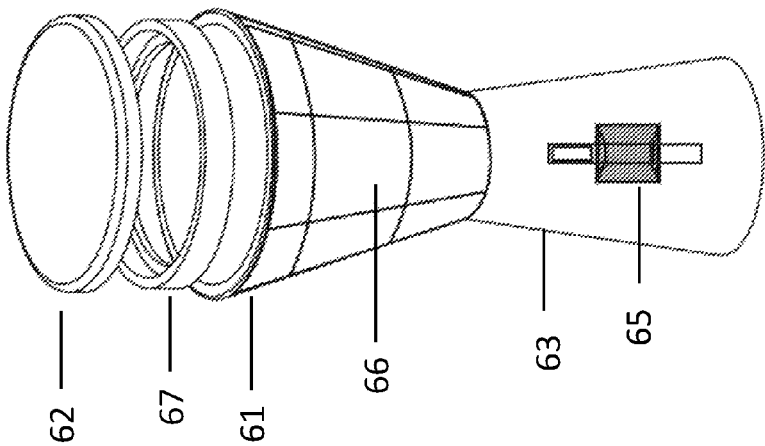
FIG. 6 is an exploded view of a drum, according to an embodiment of the present invention.

The piezo-electric element in the drum can be in the form of a ring 67, which can be seen in FIGS. 6, 7 and 8. As can be seen in these figures, the piezo-electric harvesting ring 67 can be situated between the drum skin and the drum body 61, between the upper part of the drum body 61 and the resonator 63, or could be attached to the foot of the resonator 63. Alternatively to a solid ring as illustrated in FIGS. 6 to 9, the ring may be provided as an array of piezo electric elements arranged substantially in a ring. When the ring is located at any point between the point at which the player strikes the drum and a point at which the drum is mounted, be it on a stand or on the floor, the force imparted by a player striking the drum will pass via the ring toward the stand and will be reacted by an opposite force from the stand or floor. This will create stresses in the ring, causing the piezo electric element or elements to output electrical energy, which can then be stored for later use as described. Location of an energy recovery means at any of: the drum head; a point between the drum head and a mounting point of the drum; at a mounting point of the drum; and between the drum and a body or floor to which it is mounted can therefore be advantageous.

An energy harvesting magnetic induction module can also be applied to the drum 60 of the present invention. The magnetic induction module 65 is applied to the resonator 63 of the drums shown in FIGS. 5 to 8, but could alternatively be placed anywhere on the body 61 of the drum. Since the vibrations passing through the magnetic induction module 65 will be smaller than those which apply to the shaker embodiment, the oscillations of the armature 4 will be correspondingly smaller when the magnetic induction module is applied to a drum. To improve energy recovery in this arrangement, the biasing means can be implemented as one or more springs which are attached to one or both ends of armature 4 and to one or both ends of the barrel in which the armature oscillates, to suspend the armature within the coil and/or to limit its movement within the barrel 8. This can improve the performance of the coil 3, since even small oscillations in the drum will cause the armature to move in the coil without having to overcome its weight.

A device for the harvesting, storage, and transfer of energy is disclosed, which device is adapted to be applied to, connected to, or integrated into a percussion instrument. The device comprises energy conversion means, energy storage means, and energy transfer means. The energy conversion means converts kinetic energy into electrical energy. The energy storage means cumulatively stores the electrical energy created by the energy conversion means and retains it for later use. The energy transfer means allows for the transfer of the electrical energy stored in the energy storage means to an externally connected electrical device.

A device or instrument according to the present invention can be fitted with an optional further battery charge status indictor. Preferably, the battery charge status indicator is an audible output device. The audible output device can be activated automatically when the player stops shaking the shaker, or can be activated upon the request of a user. The battery charge status indicator can be provided with a switch or button for the user to initiate the device. The device can output a sound which is dependent on the current level of charge within the battery. Alternatively the audible output device can be configured to only output sound when the battery has sufficient charge for charging of an external device to take place.

The battery charge status indicator may be configured to change the acoustic properties of the instrument, dependent on the amount of charge stored in the battery.

The electrical storage means, or battery, may be a NiMH (Nickel Metal Hydride) battery.

The electrical energy transfer from the battery to the external device takes place through the electrical connection. The electrical connection may be made with the external electrical device by means of a wireless energy transfer. Wireless energy transfer can be achieved through inductive charging. The shaker or drum can be fitted with an induction coil (not shown) at the output of the device. When an electrical device fitted with a corresponding inductive coil is brought into range of the inductive coil of the charging device, the electrical device can be charged automatically, or charging can be initiated by the user or player.

Figure 9:
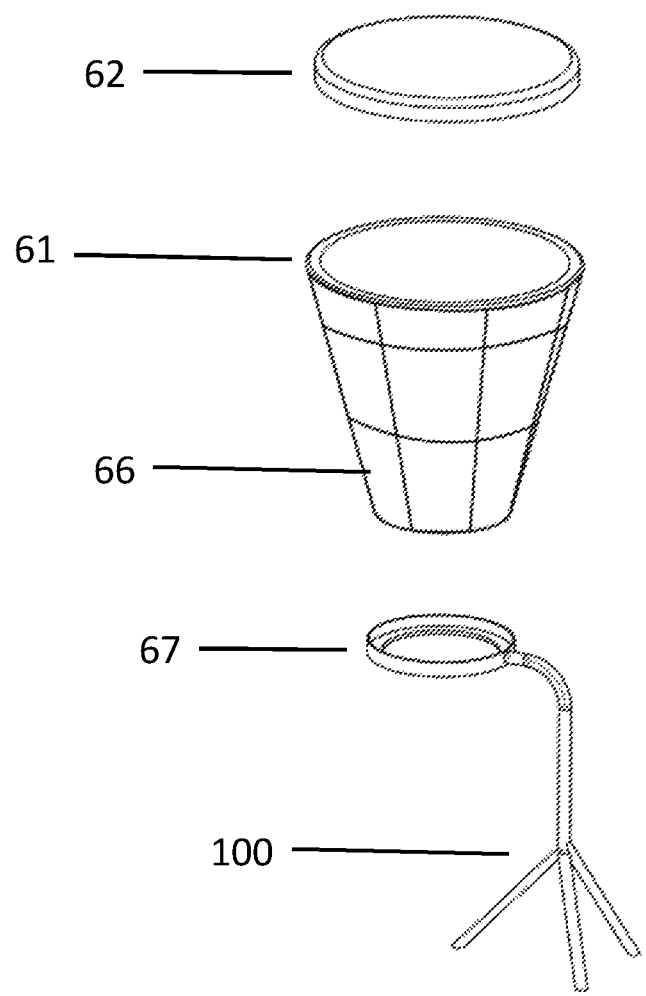
FIG. 9 is an exploded view of a drum and mount system, in accordance with an embodiment of the present invention.

Another embodiment of the invention, shown in FIG. 9 relates to a system for energy harvesting comprising a percussion instrument, a mounting means for mounting the percussion instrument, and a device for harvesting, storing, and transferring energy, as outlined above.

Many drums that are to be played require mounting. This is either because they form part of a set (or "kit") arranged around a player so that they can reach many drums from one position, or because the resonators or opening at the base of the shell are required to be open to the air and therefore not in contact with the ground, as is the case with congas and bongos. When playing drums of this kind, be it by hand or by means of a stick or beater, the body of the drum invariably vibrates within the mounting means, or the mounting means itself vibrates. This vibration is often substantial, especially in cases where the drummer is playing vigorously. In the system according to the present invention, an energy harvesting device as described above is provided, the device having a piezo-electric element arranged to be disposed at the interface between the drum body and the mounting means to take advantage of the vibrations caused there during the normal use of the drums.

The piezo-electric element could also be placed within the drum mount itself. Many drum stands or mounts contain clamping means for tightly holding male or female connector portions incorporated into or onto the body of a drum. If the mount is constructed such that it has a substantially upright portion with a laterally connected or extending portion, the interface at which they meet will be subject to vibration and oscillations, due to the fact that ordinarily a drummer plays with a substantially vertical striking motion, moving the body of the drum in a corresponding way. This means that the interface on the stand between an upright portion and the laterally extending portion which holds the drum will be subject to vibration, which can be harnessed and converted to electrical energy by any of the energy conversions means described herein.

The mounting means typically comprises a clamp arranged to securely hold the drum or drums, which is connected to a free standing stand having legs. In FIG. 9, the piezo electric harvesting ring 67 can be provided at the base of the drum as illustrated. However, all elements of the stand will also be subject to oscillating stresses as the drum is played and so location of the energy harvesting element for converting kinetic energy to electrical energy at any point between the drum and the ground may be beneficial.

In a further embodiment a kit of parts is provided comprising a percussion instrument, a mounting means, and an energy harvesting, storage and transfer device substantially as described above and arranged to be attached to the drum and the mounting means in order to extract the maximum amount of kinetic energy from the kinetic energy imparted to the drum in use.

The embodiments of the invention described above can be further modified to include geo-location means to receive signals from geo-location beacons, such as GPS satellites, to determine the location of the device or instrument and to provide the location of the instrument to a user or to a remote computer or other electronic device. The device can also be provided with a wireless data communication means for transmitting data to a remote electronic device. Such means could include NFC, Near-Field Communication, means, Wi-Fi, Bluetooth™, or other short or long range wireless communication protocols including a mobile data connection, such as GPRS, 2G, 3G or 4G data communications, as are well known in mobile telephony. These can be arranged to transmit data, including geo-location data and optionally other data, including information about the use of the instrument, including audio or musical note data, as described below.

The shaker or drum described above can be provided with means for analysing the electrical signals that are produced in the coil or piezo-electric element when the instrument is played. The amplitude of these electrical signals can be converted to digital values, for example being scaled onto the standard 128 value (0-127) scale for MIDI note velocities, and may be stored in a memory in the electric circuitry to capture a digitised, or MIDI, version of the performance. In order to recreate the performance at a later date using a remote computer having audio processing software, the circuitry of the instrument may also be provided with timing circuitry which stores the temporal information about each note of the performance—the timings of each "shake" of the shaker or strike of the drum head or body—as well as the velocity or amplitude of the impact or oscillation.

Using a standard VST plugin—featuring audio samples of the relevant instrument relating to specific MIDI velocities or velocity ranges—on a remote computer this velocity and timing information can be used to recreate a performance at a later time.

The shaker or drum of the present invention can transmit this MIDI velocity and timing data through the mobile data connection to a remote computer for storage, or the data may be stored internally and transferred out through the USB port or other electrical connection provided on the instrument. The data may be combined with geo-location data from the device either in the device or remotely at a remote computer or electronic device.

Alternatively, a microphone or pick-up can be installed in the instrument and connected to additional signal processing and data storage means provided in the instrument for digitally recording the audio data. This data can also be uploaded to a remote computer or electronic device via the wireless data connection.

Figure 10A:
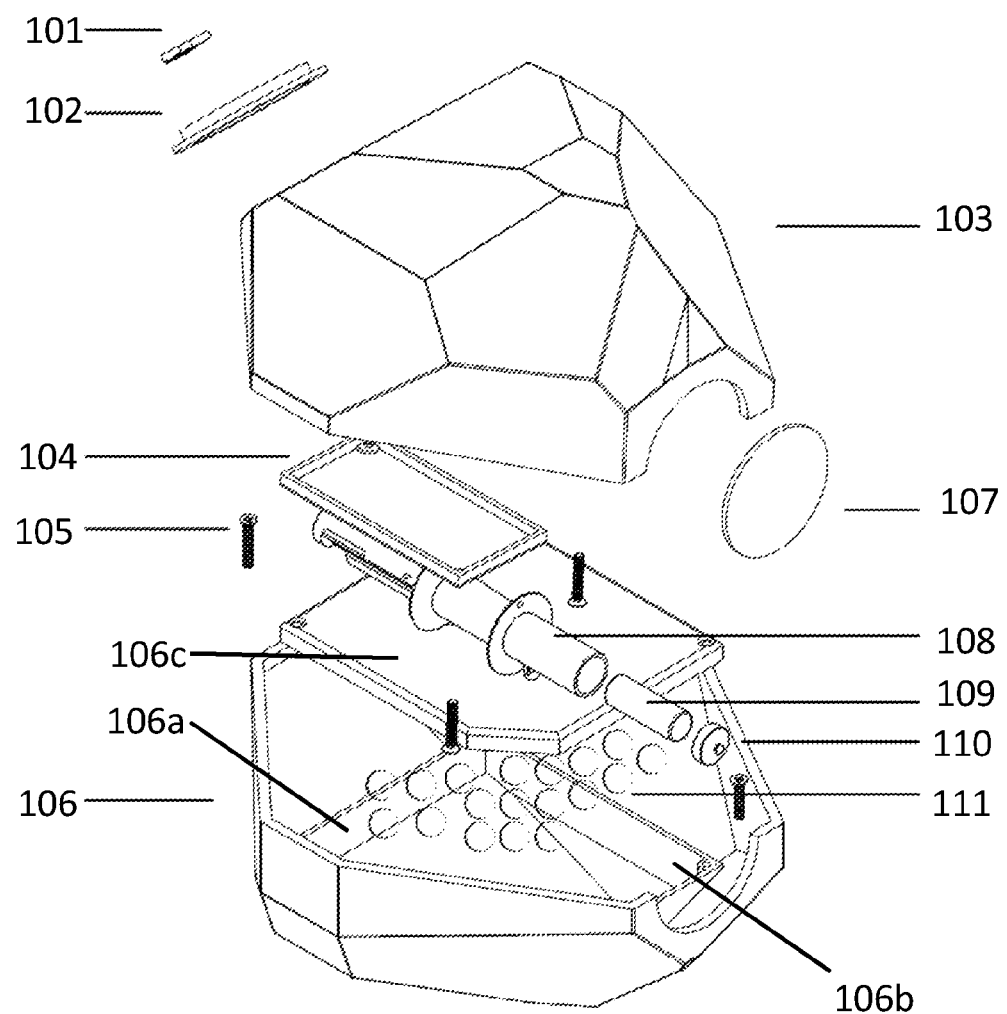
FIGS. 10A to 10C show additional and alternative features for a shaker in accordance with an alternative embodiment.
Figure 10B:
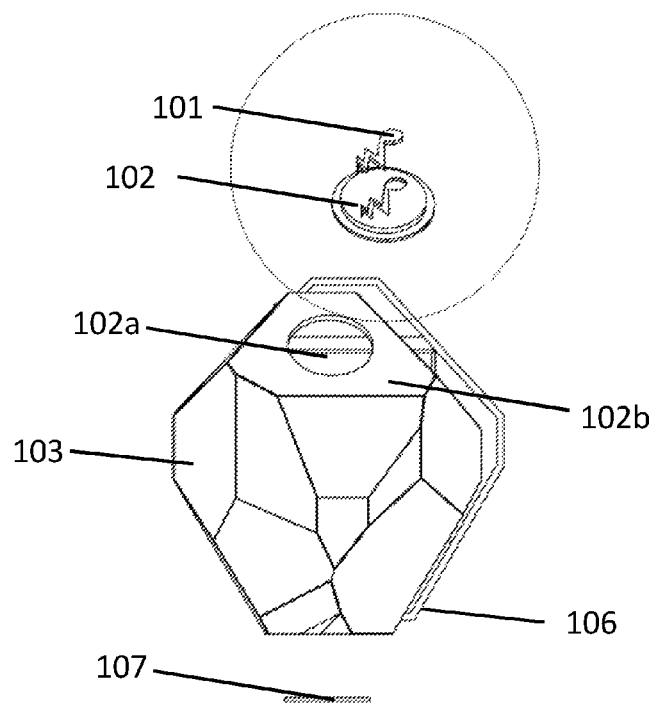
Figure 10C:
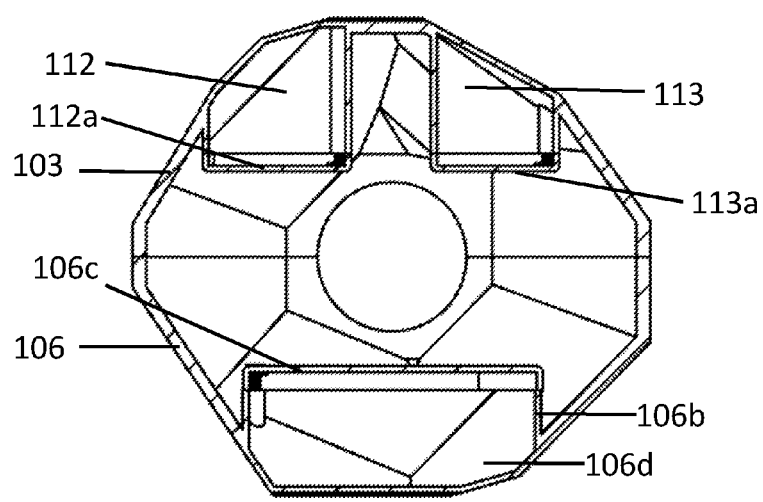

FIGS. 10A to 10C show further details of an alternative embodiment of the shaker shown in FIGS. 1 to 3. The embodiment shown in FIG. 10 is a modification to that shown in FIGS. 1 to 3 and so equivalent features of each embodiment can be combined or interchanged as necessary. The shaker shown in FIG. 10A has a housing portion comprising an upper part 103 and a lower part 106. Each of these body parts are made from recycled ABS/PC composite. The body and its parts can also be referred to as a case.

As will be described in further detail in relation to FIG. 10C, each of the upper and lower case can comprise one or more separate chambers or rattle cavities, for containing rattle members, defined by an interior wall of the upper 103 or lower 106 casing and one or more internal dividers. As can be seen in the case of the lower casing 106, it includes internal walls 106a and 106a. In conjunction with an internal cover or divider 106c, these form an enclosed chamber, which forms a rattle cavity for containing rattle members 111, which can take the form of beads or balls as described in relation to the embodiment of FIG. 1.

A further dividing cover 104 engages with internal walls attached to the upper casing or body portion 103, as is shown in more detail in FIG. 10C. One or more separate enclosures can be formed in the upper or lower body portions and those enclosures can contain rattle members of varying sizes, or rattle members of different sizes contained in different internal chambers. These can provide an improved sound or timbre for the instrument. This also isolates the rattle members from the internal electronics of the device and allows the device to be opened for potential maintenance without the rattle members escaping. A plurality of screws 105 can be provided to attach both the covers 104 and 106c to the internal walls 106a and 106b in the case of the lower housing, and to the equivalent internal walls for upper housing 103.

In the embodiment of FIGS. 10A to 10C, permanently installed LEDs are mounted within the housing behind a lens 107. The lens 107 acts to defuse, focus or disperse the light generated by the internal LEDs (not shown), depending upon its materials and configuration. The lens 107 is preferably a refracting lens, which acts to increase light intensity emitted by the internal LEDs. Biasing means 110 are incorporated as described in relation to biasing means 5 in FIG. 1. Coil 108 is also provided substantially similarly to that described in relation to FIG. 1 as item 3. The coil in either embodiment can take the form of a substantially solid body 8 with a wire winding wound around it to form the coil, as is described in relation to FIG. 1. An armature 109 is provided and is preferably in the form of a neodymium magnet, which preferably has an overall length of 22 mm and a diameter of 15 mm. The preferred mass of the magnet is 30 grammes. This sizing has been found to be preferable for providing the desired amount of charge in a specified time scale.

The device of either embodiment preferably incorporates a battery which is located near to a removable side panel of the device, to enable ease of replacement of the battery. The barrel 8 in which the armature 109 is located is preferably angled relative to a principal axis of the shaker, which enables maximisation of the efficiency of the kinetic energy recovery means of the device within an efficiently configured housing of the shaker.

The LED torch output of the device is preferably configured such that it achieves light intensity of 25 lumen at its full setting and 12 lumen at a half setting. The device preferably therefore has higher intensity and lower intensity light settings for internal electric light generation means, which are preferably provided by the LEDs. An external resilient on/off switch is preferably provided on the device for turning on or off the internal light emitting means incorporated into the device. This is preferably made from rubber or other resilient and substantially dust-proof and waterproof material.

An output connection of the device is preferably provided in the form of an electrical connector. The electrical connector is preferably a USB type A connector, but any electrical connector can be included. An electrical jack output may be additionally or alternatively be included for charging mobile telephones or other devices which use this type of connector. Therefore, different electrical output connectors can be provided for ease of connection of the device to different mobile phone or device types.

An electrical input may be provided for connection of an external energy input. The external energy input may be from a mains charger, from a computer, or from an externally connected solar panel. The preferred external connector is a USB type connector. More preferably, the external electrical connector for input is a USB type B connector.

The body of the device also preferably incorporates external connection points for a strap, such as external eyelets or loops or other formations for attachment of a strap to carry the device.

An external solar panel may be included with the device and may be disconnectable from the device and easily reconnectable by a user for regular disconnection and reconnection. The preferred measurement of the solar panel is 80 mm by 130 mm. This has been found to provide a full battery charge in eight hours of sunlight, which allows the device to be charged every day, where appropriate sunlight levels are available, and its lights can then be used overnight. The solar panel is preferably of a type known as PET.

Embossed arrows may be provided on the shaker body to show the direction of play of the shaker. Providing these as embossed features allows ease of identification of the correct direction of shaking of the device, for all users, including users who need to charge the device when no light is available, and also users with impaired vision. This is particularly useful in developing countries, where the shaker may be the only available light source during hours of darkness and where corrective eyewear may not be readily available.

FIG. 10B shows the configuration of a power control button 101 for operating the internal light emitting means forming the torch of the device, which button 101 is surrounded by a resilient cover 102. This subassembly is mounted within an opening 102a in upper housing 103, but could additionally or alternatively by combined into lower housing 106. The device of this embodiment is configured so that the button 101 is lit up by a relatively low power LED when the device is charging, to indicate that the user is successfully charging the device, either by external power input or by recovery of kinetic energy from the device. The button therefore doubles up as a charging indicator, but also as an actuator for activating the torch on the device. Therefore, if in the dark, a brief shaking of the device will light up the torch activating button to inform a user of its location in order to activate the torch on the device in the dark. As can be seen, the button is provided with an attractive shape, in this instance in the form of a musical note with a spark or lightening form attached to the tail of the musical note and this is surrounded by the resilient cover portion 102 shown in the Figure. The different parts of the button can be made in any suitable form, but preferably comprise a resilient portion and a transparent portion for light generated by an internal LED to pass through.

FIG. 10C shows a cross section through the device when it is fully assembled. The cross section is viewed substantially along the principal longitudinal axis of the coil barrel 108 and armature assembly 109 shown in FIG. 10. It can be seen that inside the housing, there is an internal chamber for the rattle members 111 formed in the lower body 106 and a plurality of chambers 112 and 113 are provided in upper body portion 103. These chambers are formed from the outer walls of the housing portions 103 and 106, in combination with internal separation walls 106b as illustrated in FIG. 10A for the lower housing portion 106. Each chamber is also provided with a cover portion, 106c, in the case of the lower housing portion 106. Removable covers 112A and 113A are also provided for the chambers in the upper housing portion 103.

The body parts are fixed together with the illustrated attachment means such as screws 5, and the screw openings in the body are then preferably sealed with resilient inserts, such as rubber inserts, for preventing the ingress of dust and/or water.

The device of the invention, which may comprise a toy or a shaker or any other product described herein, can therefore incorporate any or all of the following features:
- an internal light source, preferably comprising LEDs
- a removable battery
- a removable panel covering the removable battery
- one or more separate rattle compartments for retaining rattle members separately from the internal electronics of the device
- a first light internal source for providing a torch function
- a second light source for indicating that the device is charging its internal battery
- the first light source may be of greater power output than the second light source
- a resilient power switch
- a light source in the power switch
- physical direction indication means for indicating a direction for actuating the device to generate energy
- an external disconnectable and reconnectable solar panel Although specific embodiments are described in the above, it will be appreciated that alterations and variations can be made without departing from the scope of the invention as defined in the claims. Although the principal disclosure relates to energy recovery from a percussion instrument, the invention may be applied in certain alternative configurations to other bodies to which kinetic energy, in particular a reciprocating or percussive motion, is imparted during normal use.

The invention claimed is:

1. A shaken idiophone, comprising:
   a means for converting kinetic energy imparted to the shaken idiophone into electrical energy, wherein the kinetic energy is imparted through shaking of the shaken idiophone, wherein the means for converting kinetic energy is configured to convert the kinetic energy recovered from cyclical oscillations in the idiophone into electrical energy, wherein the means for converting kinetic energy comprises at least one coil and an armature;
   a means for storing the electrical energy for later use;
   a means for transferring the stored electrical energy to an externally connected electrical device, wherein the means for converting kinetic energy is electrically connected to the means for storing the electrical energy, in order that an electrical current can be converted into stored electrical charge in the means for storing the electrical energy;

a bridge rectifier located between the means for converting kinetic energy and the means for storing the electrical energy, to rectify an output from the at least one coil;

a hollow body having at least one interior rattle cavity, wherein the hollow body further comprises an energy convertor housing portion for housing the means for converting kinetic energy and the means for storing the electrical energy; and a divider for dividing the energy convertor housing portion from the at least one interior rattle cavity, wherein the hollow body contains at least one rattle portion, and the energy convertor housing portion is located adjacent the at least one rattle portion.

2. The shaken idiophone of claim 1, wherein the shaken idiophone is at least one of a percussion instrument, a musical instrument, and a child's toy.

3. The shaken idiophone of claim 1, further comprising a main body forming a principal structure of the shaken idiophone, wherein the means for converting kinetic energy is configured to convert the kinetic energy imparted to the main body of the shaken idiophone into electrical energy.

4. The shaken idiophone of claim 3, wherein the means for converting kinetic energy is a piezo-electric element.

5. The shaken idiophone of claim 1, further comprising a geo-location means.

6. The shaken idiophone of claim 1, further comprising a wireless data connection means.

7. The shaken idiophone of claim 1, wherein the means for converting kinetic energy further comprises a linear barrel, in which the armature can freely oscillate, wherein the barrel is orientated along a principal axis of movement of the shaken idiophone, in order that a maximum amount of the kinetic energy is imparted to the armature in use, and wherein the at least one coil and the armature are arranged such that movement of the at least one coil and the armature with respect to one another due to the motion of the shaken idiophone, creates an electrical current in the coil.

8. The shaken idiophone of claim 7, further comprising biasing means situated at at least one end of the barrel for biasing against the movement of the armature towards the end of the barrel, wherein the biasing means comprises at least one of a deformable member, a spring, and a rubber plug.

9. The shaken idiophone of claim 7, further comprising sound damping means for damping sound created by an impact of the armature against an end of the barrel.

10. The shaken idiophone of claim 1, wherein the armature is at least one of a magnet and a neodymium magnet.

11. The shaken idiophone of the claim 10, wherein the biasing means comprises magnets orientated to repel the armature.

12. The shaken idiophone of claim 1, further comprising a battery charge indicator for indicating the battery charge level to a user, wherein the battery charge indicator comprises a first light source, wherein the first light source illuminates when the means for storing the electrical energy reaches a first predetermined level of charge; and a second light source, which illuminates upon user input when the charge in the means for storing the electrical energy is above a second predetermined threshold level of charge.

13. The shaken idiophone of claim 12, wherein the battery charge indicator further comprises an audible output device.

14. The shaken idiophone of claim 1, further comprising a photovoltaic cell and a boost convertor, and wherein at least one of the means for converting kinetic energy and the photovoltaic cell is connected to the means for storing the electrical energy via the boost convertor.

15. The shaken idiophone of claim 1, wherein the means for transferring the stored electrical energy is arranged to transfer the energy wirelessly.

16. The shaken idiophone of claim 15, wherein the means for transferring the stored electrical energy is arranged to transfer the energy through inductive coupling.

17. The shaken idiophone of claim 1, wherein the means for converting kinetic energy further comprises a piezo-electric element.

* * * * *